(12) United States Patent
Xu et al.

(10) Patent No.: US 8,478,748 B2
(45) Date of Patent: Jul. 2, 2013

(54) DIRECTLY OPTIMIZING EVALUATION MEASURES IN LEARNING TO RANK

(75) Inventors: Jun Xu, Tianjin (CN); Tie-Yan Liu, Beijing (CN); Hang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1071 days.

(21) Appl. No.: 12/237,293

(22) Filed: Sep. 24, 2008

(65) Prior Publication Data

US 2010/0082606 A1    Apr. 1, 2010

(51) Int. Cl.
*G06F 17/30* (2006.01)

(52) U.S. Cl.
USPC .......................................... 707/723

(58) Field of Classification Search
USPC .......................................... 707/723
See application file for complete search history.

(56) References Cited

U.S. PATENT DOCUMENTS

| | | | |
|---|---|---|---|
| 6,947,920 | B2 | 9/2005 | Alpha |
| 7,363,296 | B1 | 4/2008 | Naam et al. |
| 7,925,651 | B2 * | 4/2011 | Burges et al. ................. 707/723 |
| 2005/0050087 | A1 * | 3/2005 | Milenova et al. ............. 707/102 |
| 2007/0156656 | A1 * | 7/2007 | Pather et al. ....................... 707/3 |
| 2007/0217676 | A1 * | 9/2007 | Grauman et al. ............. 382/170 |
| 2007/0276807 | A1 * | 11/2007 | Chen et al. ......................... 707/3 |
| 2008/0027912 | A1 | 1/2008 | Liu et al. |
| 2008/0027925 | A1 | 1/2008 | Li et al. |
| 2008/0097941 | A1 * | 4/2008 | Agarwal ......................... 706/12 |
| 2008/0319973 | A1 * | 12/2008 | Thambiratnam et al. ......... 707/5 |

FOREIGN PATENT DOCUMENTS

WO    WO-2008017103    2/2008

OTHER PUBLICATIONS

"Directly Optimizing Evaluation Measures in Learning to Rank" Jun Xu et al. SIGIR'08, Jul. 20-24 2008, Singapore. Copyright 2008 ACM 978-1-60558-164—Apr. 8, 2007.*
"AdaRank: A Boosting Algorithm for Information Retrieval" Jun Xu ACM SIGIR 2007 Proceedings.*
"AdaRank: A Boosting Algorithm for Information Retrieval" ACM SIGIR 2007 Proceedings.*
Cao, Yunbo et al., "Adapting Ranking SVM to Document Retrieval," Proceedings of the 29th annual international ACM SIGIR conference on Research and development in information retrieval, 2006, pp. 186-193, http://delivery.acm.org/10.1145/1150000/1148205/p186-cao.pdf?key1=1148205&key2=7137124121&coll=GUIDE&dl=GUIDE&CFID=33679638&CFTO KEN=96821906 [last accessed Jan. 7, 2009].

(Continued)

*Primary Examiner* — Rehana Perveen
*Assistant Examiner* — Masoud S Hakami
(74) *Attorney, Agent, or Firm* — Perkins Coie LLP

(57) ABSTRACT

The present invention provides methods for improving a ranking model. In one embodiment, a method includes the step of obtaining queries, documents, and document labels. The process then initializes active sets using the document labels, wherein two active sets are established for each query, a perfect active set and an imperfect active set. Then, the process optimizes an empirical loss function by the use of the first and second active set, whereby parameters of the ranking model are modified in accordance to the empirical loss function. The method then updates the active sets with additional ranking data, wherein the updates are configured to work in conjunction with the optimized loss function and modified ranking model. The recalculated active sets provide an indication for ranking the documents in a way that is more consistent with the document metadata.

20 Claims, 4 Drawing Sheets

OTHER PUBLICATIONS

Jarvelin, Kalervo et al., "Cumulated Gain-Based Evaluation of IR Techniques," ACM Tranactions on Information Systems, vol. 20, No. 4, Oct. 2002, pp. 422-446, http://www-static.cc.gatech.edu/~zha/CS8803WST/dcg.pdf [last accessed Jan. 7, 2009].

Le, Quoc et al., "Direct Optimization of Ranking Measures," 2007, pp. 1-25, http://arxiv.org/PS_cache/arxiv/pdf/0704/0704.3359v1.pdf [last accessed Jan. 7, 2009].

Taylor, Michael et al., "Optimisation Methods for Ranking Functions with Multiple Parameters," CIKM'06, Nov. 5-11, 2006, Arlington, Virginia, USA, ACM 2006, pp. 585-593, http://research.microsoft.com/users/nickcr/pubs/taylor_cikm06.pdf [last accessed Jan. 7, 2009].

Xu, Jun et al., "AdaRank: A Boosting Algorithm for Information Retrieval," SIGIR'07, Jul. 23-27, 2007, Amsterdam, The Netherlands, ACM 2007, pp. 391-398.

Zeng, Hua-Jun, et al., "Learning to Cluster Web Search Results," Proceedings of the 27th Annual International ACM SIGIR Conference on Research and Development in Information Retrieval, 2004, pp. 210-217.

* cited by examiner

Table 1: Summary of natations.

| Notations | Explanations |
|---|---|
| $q_i \in Q$ | Query |
| $\mathbf{d}_i = \{d_{i1}, d_{i2}, \cdots, d_{i,n(q_i)}\}$ | List of documents for $q_i$ |
| $d_{i,j} \in D$ | Document in $\mathbf{d}_i$ |
| $\mathbf{y}_i = \{y_{i1}, y_{i2}, \cdots, y_{i,n(q_i)}\}$ | List of ranks for $q_i$ |
| $y_{i,j} \in \{r_1, r_2, \cdots, r_l\}$ | Rank of $d_{i,j}$ w.r.t. $q_i$ |
| $S = \{(q_i, \mathbf{d}_i, \mathbf{y}_i)\}_{i=1}^m$ | Training set |
| $\pi_i \in \Pi_i$ | Permutation for $q_i$ |
| $\pi_i^* \in \Pi_i^* \subseteq \Pi_i$ | Perfect permutation for $q_i$ |
| $\phi(q_i, d_{i,j})$ | Feature vector w.r.t. $(q_i, d_{i,j})$ |
| $\Phi(q_i, \mathbf{d}_i, \pi_i)$ | Feature vector w.r.t. $(q_i, \mathbf{d}_i, \pi_i)$ |
| $f$ and $F$ | Ranking models |
| $E(\pi_i, \mathbf{y}_i) \in [0, +1]$ | Evaluation of $\pi_i$ w.r.t. $\mathbf{y}_i$ for $q_i$ |

*FIG. 1*

Input: $S = \{(q_i, \mathbf{d}_i, \mathbf{y}_i)\}_{i=1}^m$, parameters $E$ and $T$
Initialize $\mathcal{B}_i^1$ and $C_i^1$, for all $i = 1, \cdots, m$.
For $t = 1, \cdots, T$

- $F_t = \arg\max_{F \in \mathcal{F}} L(\mathcal{B}_1^t, C_1^t, \cdots, \mathcal{B}_m^t, C_m^t)$.

- Update $\mathcal{B}_i^{t+1}$ and $C_i^{t+1}$, for all $i = 1, \cdots, m$.

- break if $\mathcal{B}_i^{t+1} = \mathcal{B}_i^t$ and $C_i^{t+1} = C_i^t$, for all $i = 1, \cdots, m$.

End For
return $F_t$.

*FIG. 3*

DIRECTLY OPTIMIZING EVALUATION MEASURES IN LEARNING TO RANK

BACKGROUND

In learning to rank for information retrieval, a ranking model is constructed with training data consisting of queries, their corresponding retrieved documents, and relevance levels given by humans. In ranking, given a new query, the retrieved documents are ranked by using the trained ranking model.

In Information Retrieval (IR), usually ranking results are evaluated in terms of evaluation measures such as MAP (Mean Average Precision) and NDCG (Normalized Discounted Cumulative Gain). Ideally a learning algorithm would train a ranking model by optimizing the performance in terms of a given evaluation measure. In this way, higher accuracy in ranking can be expected. However, this is usually difficult due to the non-continuous and non-differentiable nature of the IR measures.

Many learning to rank algorithms proposed so far typically minimize a loss function loosely related to the IR measures. For example, Ranking SVM and RankBoost minimize loss functions based on classification errors on document pairs.

Recently, researchers have developed several new algorithms that manage to directly optimize the performance in terms of the IR measures. For example, $SVM^{map}$ and AdaRank minimize loss functions based on the IR measures.

There are still open questions regarding to the direct optimization approach. (1) Is there a general theory that can guide the development of new algorithms? (2) What is the relation between existing methods such as $SVM^{map}$ and AdaRank? (3) Which direct optimization method performs the best empirically?

SUMMARY

In response to some of the issues described above, the present invention provides method for improving a ranking model. In one embodiment, a method includes the process of obtaining a data set of queries, documents, and document labels. The process then initializes active sets using the document labels, wherein two active sets are established for each query, a perfect active set and an imperfect active set. Then, the process optimizes an empirical loss function based on the first and second active set, whereby parameters of the ranking model are modified in accordance to the optimization of the empirical loss function. The method then updates the active sets with additional ranking data, wherein the updates are configured to work in conjunction with the optimized loss function and modified ranking model. The recalculated active sets provide an indication for ranking the documents in a way that is more consistent with the document labels.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 illustrates a table of notations.

FIG. 3 illustrates a PermuRank algorithm in accordance with one aspect of the present invention.

DETAILED DESCRIPTION

Figure 2A:
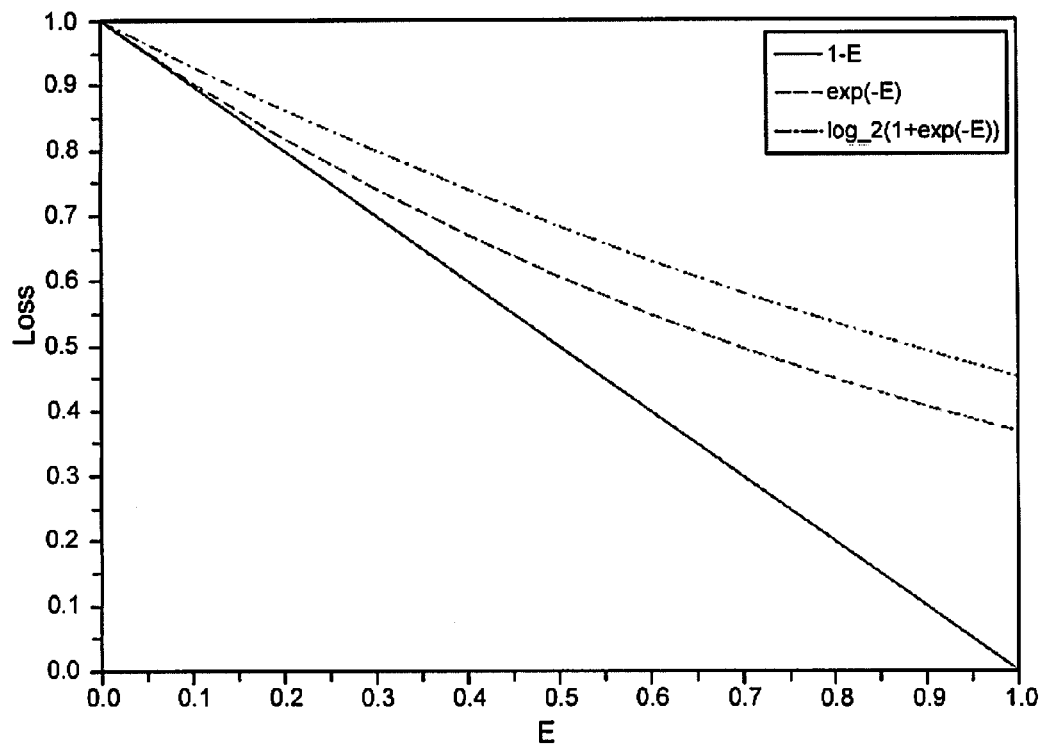
FIG. 2A illustrates a type one bounds.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "evaluator," "sensor," "device," "cloud," 'network," "optimizer," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The detailed description below first provides a description of embodiments of the present invention. The paragraphs that follow disclose a comprehensive study on direct optimization of IR measures in learning to rank. As described in more detail below, we conduct a general analysis on the approach. We indicate that direct optimization of IR measures amounts to minimizing different loss functions based on the measures. We first introduce one basic loss function which is directly defined on the basis of the IR measures. We then indicate that there are two types of upper bounds on the basic loss function. We refer to them as type one bound and type two bound respectively. Minimizing the two types of upper bounds leads to different learning algorithms. With the analysis, different algorithms can be easily studied and compared. Moreover, new algorithms can be easily derived. As example, we create a new algorithm called PermuRank. We show that existing algorithms of AdaRank and SVM$^{map}$ manage to minimize loss functions which are type one upper bound and type two upper bound respectively. We have compared the performances of the exiting direct optimization methods using several benchmark data sets. Experimental results show that the direct optimization methods of SVM$^{map}$, AdaRank, and PermuRank can always improve upon the baseline methods of Ranking SVM and RankBoost. Furthermore, the direct optimization methods themselves can work equally well.

Other sections of the detailed description describe the problem of learning to rank for information retrieval. Following that, we propose a general framework for directly optimizing evaluation measures. Two existing algorithms of SVM$^{map}$ and AdaRank, and a new algorithm PermuRank are analyzed and discussed within the framework. The sections then following cover experimental results.

The key problem for document retrieval is ranking, specifically, to create a ranking model that can sort documents based on their relevance to the given query. Traditional ranking models such as BM25 and LMIR (Language Models for Information Retrieval) only have a few parameters to tune. As the ranking models become more sophisticated (with more features) and more labeled data become available, how to tune or train a ranking model becomes a challenging issue.

In recent years, methods of 'learning to rank' have been applied to ranking model construction and promising results have been obtained. Learning to rank is to automatically create a ranking model by using labeled training data and machine learning techniques. Several approaches have been proposed. The pairwise approach transforms the ranking problem into binary classification on document pairs. Typical methods include Ranking SVM, Rank-Boost, and RankNet. The methods of Ranking SVM, RankBoost, and RankNet minimize loss functions that are loosely related to the evaluation measures such as MAP and NDCG.

Recently, the approach of directly optimizing the performance in terms of IR measures have also been proposed. There are three categories. First, one can minimize loss functions upper-bounding the basic loss function defined on the IR measures. For example, SVM$^{map}$ minimizes a hinge loss function, which upper bounds the basic loss function based on Average Precision. AdaRank minimizes an exponential loss function upper bounding the basic loss function.

Second, one can approximate the IR measures with functions that are easy to handle. For example, Softrank proposes an approximation of NDCG. Third, Genetic Programming (GP) is used to optimize the IR measures. For example, proposed a specifically designed GP for learn a ranking model for IR. Aspects of the technology herein involve the first category and take SVM$^{map}$ and AdaRank as examples of existing methods.

Learning to rank for Information Retrieval is a problem as follows. In retrieval (testing), given a query the system returns a ranked list of documents in descending order of their relevance scores. In learning (training), a number of queries and their corresponding retrieved documents are given. Furthermore, the labels of the documents with respect to the queries are also provided. The labels represent ranks (i.e., categories in a total order). The objective of learning is to construct a ranking model which achieves the best result on test data in the sense of minimization of a loss function. Ideally the loss function is defined directly on an IR measure used in testing.

Suppose that $Y=\{r_1, r_2, \ldots, r_l\}$ is the set of ranks, where l denotes the number of ranks. There exists a total order between the ranks $r_l > r_{l-1} > \ldots > r_1$, where > denotes the order. Suppose that $Q=\{q_1, q_2, \ldots, q_m\}$ is the set of queries in training. Each query $q_i$, is associated with a list of retrieved documents $d_i = \{d_{i1}, d_{i2}, \ldots d_{i,n(q_i)}\}$ and a list of labels $y_i = \{y_{i1}, y_{i2}, \ldots, y_{i,n(q_i)}\}$, where $n(q_i)$ denotes the sizes of lists $d_i$ and $y_i$, $d_{ij}$ denotes the $j^{th}$ document in $d_i$, and $y_{ij} \in Y$ denotes the label of document $d_{ij}$. A feature vestor $\phi(q_i, d_{ij})$ is created from each query-document pair $(q_i, d_{ij})$, $i=1,2,\ldots, m$; $j=1,2,\ldots, n(q_i)$. The training set is denoted as $S = \{(q_i, d_i, y_i)\}_{i=1}^m$.

Let the documents in $d_i$ be identified by the integers $\{1,2,\ldots, n(q_i)\}$. We define permutation $\pi_i$ on $d_i$ as a bijection from $\{1,2,\ldots, n(q_i)\}$ to itself. We use $\Pi_i$ to denote the set of all possible permutations on $d_i$, and use $\pi_i(j)$ to denote the position of item j (i.e., $d_{ij}$). Ranking is nothing but to select a permutation $\pi_i \in \Pi_i$ for the given query $q_i$ and the associated list of documents $d_i$ using the ranking model.

The ranking model is a real valued function of features. There are two types of ranking models. We refer to them as f and F respectively.

Ranking model f is a document level function, which is a linear combination of the features in feature vector $\phi(q_i, d_{ij})$:

$$f(q_i, d_{ij}) = w^T \phi(q_i, d_{ij}) \quad (1)$$

where w denotes the weight vector. In ranking for query $q_i$ we assign a score to each of the documents using $f(q_i, d_{ij})$ and sort the documents based on the scores. We obtain a permutation denoted as $\bar{\pi}_i$.

Ranking model F as a query level function. We first introduce a query level feature vector for each triple of $q_i$, $d_i$ and $\pi_i$, denoted as $\Phi(q_i, d_i, \pi_i)$. We calculate $\Phi$ by linearly combining the feature vectors of query-document pairs for $q_i$:

$$\Phi(q_i, d_i, \pi_i) = \frac{1}{n(q_i) \cdot (n(q_i)-1)} \sum_{k,l:k<l} [z_{kl}(\phi(q_i, d_{ik}) - \phi(q_i, d_{il}))], \quad (2)$$

where $z_{kl} = +1$ if $\pi_i(k) < \pi_i(l)$ ($d_{ik}$ is ranked ahead $d_{il}$ in $\pi_i$), and $-1$ otherwise. We define F as a linear combination of the features in feature vector $\Phi$:

$$F(q_i, d_i, \pi_i) = w^T \Phi(q_i, d_i, \pi_i), \quad (3)$$

where w denotes the weight vector. In ranking, the permutation with the largest score given by F is selected:

$$\tilde{\pi}_i = \underset{\pi_i \in \Pi_i}{\arg\max}\, F(q_i, d_i, \pi_i) \quad (4)$$

It can be shown that, the two types of ranking models are equivalent, if the parameter vectors w's in the two models are identical.

THEOREM 1. Given a fixed parameter vector w, the two ranking models f and F generate the same ranking result. That is, permutations $\bar{\pi}_i$ and $\tilde{\pi}_i$ are identical.

Theorem 1 implies that Equation (4) can be computed efficiently by sorting documents using Equation (1).

In IR, evaluation measures are used to evaluate the goodness of a ranking model, which are usually query-based. By query based, we mean that the measure is defined on a ranking list of documents with respect to the query. These include MAP, NDCG, MRR (Mean Reciprocal Rank), WTA (Winners Take ALL), and Precision@n. We utilize a general function $E(\pi_i, y_i) \in [0, +1]$ to represent the evaluation measures. The first argument of E is the permutation $\pi_i$ created using the ranking model. The second argument is the list of ranks $y_i$ given as ground truth. E measures the agreement between $\pi_i$ and $y_i$. Most evaluation measures return real values in [0, +1]. We denote the perfect permutation as $\pi^*_i$. Note that there may be more than one perfect permutation for a query, and we use $\Pi^*_i$ to denote the set of all possible perfect permutations for query $q_i$. For $\pi^*_i \in \Pi^*_i$, we have $E(\pi^*_i, y_i)=1$. FIG. 1 illustrates a table of the notations described above.

In this section, we give a general framework for analyzing learning to rank algorithms that directly optimize evaluation measures.

Ideally, we would create a ranking model that maximize the accuracy in terms of an IR measure on training data, or equivalently, minimize the loss function defined as follows:

$$R(F) = \sum_{i=1}^{m} (E(\pi^*_i, y_i) - E(\pi_i, y_i)) = \sum_{i=1}^{m} (1 - E(\pi_i, y_i)), \quad (5)$$

where $\pi_i$ is the permutation selected for query $q_i$ by ranking model F (or f). In this paper, we refer to the loss function R(F) (or R(f)) as the 'basic loss function'.

It is difficult to directly minimize the basic loss function R(F), because E is non-continuous and non-differentiable. We instead try to minimize upper bounds of it. In this paper, we call the approach the 'direct optimization approach'.

We can consider two types of upper bounds. The first one is defined directly on the IR measures (type one bound). The second one is defined on the pairs between the perfect and imperfect permutations (type two bound). AdaRank and SVM$^{map}$ turns out to be algorithms that minimize one of the two upper bounds, respectively. PermuRank which we propose in this paper is an algorithm that tries to minimize a type two bound.

The basic loss function can be upper bounded directly by the exponential function, logistic function, etc., which are widely used in machine learning. The logistic function is defined as $$\sum_{i=1}^{m} \log_2(1 + e^{-E(\pi_i, y_i)}).$$

The exponential function is defined as $$\sum_{i=1}^{m} \exp\{-E(\pi_i, y_i)\}.$$

We can use the exponential function and logistic function as 'surrogate' loss functions in learning. Note that both functions are continuous, differentiable, and even convex w.r.t. E. FIG. 2A plots the basic loss function, exponential loss function, and logistic loss function. From the figure, we can see that exponential loss function is tighter than the logistic loss function.

The AdaRank algorithm actually minimizes the exponential loss function (type one bound). To do so, AdaRank repeats the process of re-weighting the training query, creating a weak ranker, and calculating a weight for weak the ranker, and finally linearly combines the weak rankers as the final ranking model.

Here, we, introduce a new loss function.

$$\sum_{i=1}^{m} \max_{\pi^*_i \in \Pi^*_i, \pi_i \in \Pi_i \setminus \Pi^*_i} ((E(\pi^*_i, y_i) - E(\pi_i, y_i)) \cdot [\![(F(q_i, d_i, \pi^*_i) \leq F(q_i, d_i, \pi_i))]\!]), \quad (6)$$

Where $[\![.]\!]$ is one if the condition is satisfied, otherwise zero.

The loss function measures the loss when the worst prediction is made, specifically, the difference between the performance of the perfect permutation (it equals one) and the minimum performance of an incorrect permutation (it is less than one).

The following theorem holds with regard to the new loss function.

THEOREM 2. The basic loss function in (5) is upper bounded by the new loss function in (6).

The loss function (6) is still not continuous and differentiable because it contains the 0-1 function $[\![.]\!]$, which is not continuous and differentiable. We can consider using continuous, differentiable, and even convex upper bounds on the loss function (6), which are also upper bounds on the basic loss function (5).

1) The 0-1 function $[\![.]\!]$ in (6) can be replaced with its upper bounds, for example, hinge, exponential, and logistic functions, yielding $$\sum_{i=1}^{m} \max_{\pi^*_i \in \Pi^*_i, \pi_i \in \Pi_i \setminus \Pi^*_i} (E(\pi^*_i, y_i) - E(\pi_i, y_i)) \cdot e^{-(F(q_i, d_i, \pi^*_i) - F(q_i, d_i, \pi_i))};$$

$$\sum_{i=1}^{m} \max_{\pi^*_i \in \Pi^*_i, \pi_i \in \Pi_i \setminus \Pi^*_i} (E(\pi^*_i, y_i) - E(\pi_i, y_i)) \cdot \log_2(1 + e^{-(F(q_i, d_i, \pi^*_i) - F(q_i, d_i, \pi_i))});$$

$$\sum_{i=1}^{m} \max_{\pi^*_i \in \Pi^*_i, \pi_i \in \Pi_i \setminus \Pi^*_i} (E(\pi^*_i, y_i) - E(\pi_i, y_i)) \cdot [1 - (F(q_i, d_i, \pi^*_i) - F(q_i, d_i, \pi_i))]_+;$$

$$\sum_{i=1}^{m} \left[ \max_{\pi^*_i \in \Pi^*_i, \pi_i \in \Pi_i \setminus \Pi^*_i} ((E(\pi^*_i, y_i) - E(\pi_i, y_i)) - (F(q_i, d_i, \pi^*_i) - F(q_i, d_i, \pi_i))) \right]_+,$$

Where $[.]_+$ denotes the hinge function.

Figure 2B:
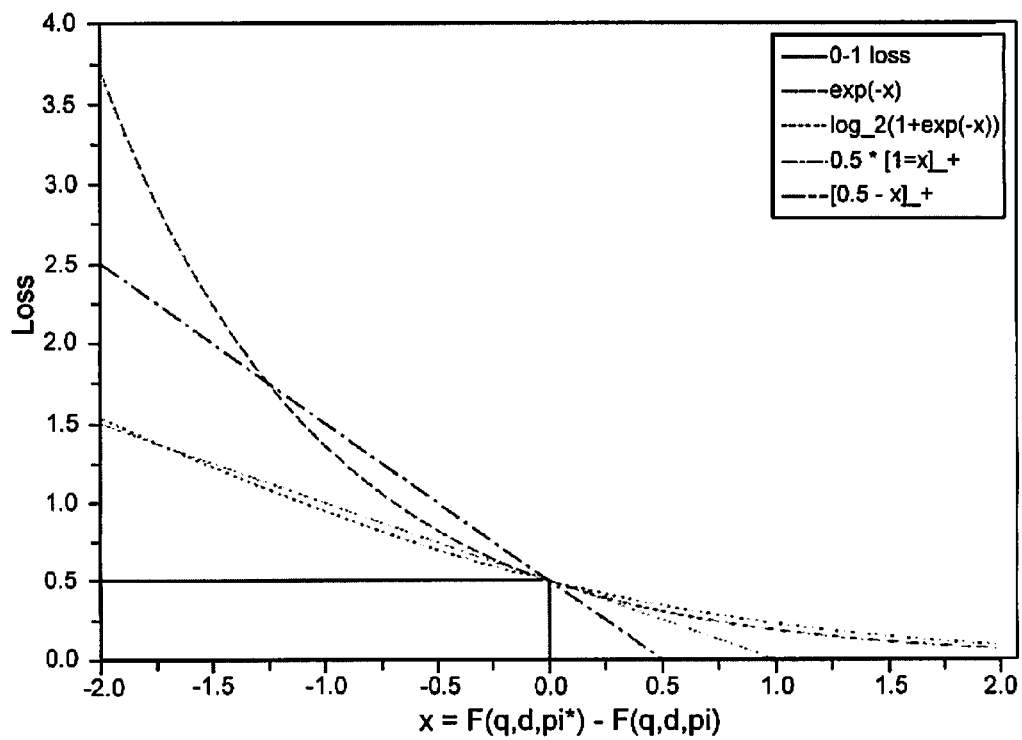
FIG. 2B illustrates a type two bounds.

FIG. 2B shows the relations between the loss function (6) and its upper bounds, where $E(\pi^*_i, y_i) - E(\pi_i, y_i)$ is set to 0.5. From the figure, we can see that it is not possible to say which upper bound is the tightest. Different upper bounds may be suitable for different data sets.

2) The max function can also be replaced with its upper bound of sum function. This is because $$\sum_i x_i \geq \max_i x_i \text{ if } x_i \geq 0$$

holds for all i.

3) Relaxations 1 and 2 can be applied simultaneously.

For example, replacing [[.]] with hinge function and max with sum, we obtain:

$$\sum_{i=1}^{m} \sum_{\pi_i^* \in \Pi_i^*, \pi_i \in \Pi_i \setminus \Pi_i^*} (E(\pi_i^*, y_i) - \quad (7)$$

$$E(\pi_i, y_i)) \cdot [1 - (F(q_i, d_i, \pi_i^*) - F(q_i, d_i, \pi_i))].$$

We can derive different algorithms by using the upper bounds as surrogate loss functions. SVM$^{map}$ and PermuRank are two examples.

SVM$^{map}$ solves the following quadratic programming problem:

$$\min_{\vec{w}, \xi \geq 0} \frac{1}{2} \|\vec{w}\|^2 + \frac{C}{m} \sum_{i=1}^{m} \xi_i \quad (8)$$

$$\text{s.t.} \forall i, \forall \pi_i^* \in \prod_i^*, \forall \pi_i \in$$

$$\prod_i \setminus \prod_i^* : F(q_i, d_i, \pi_i^*) - F(q_i, d_i, \pi_i) \geq E(\pi_i^*, y_i) - E(\pi_i, y_i) - \xi_i,$$

where C is the coefficient for trade-off between total empirical loss and model complexity, and $\xi_i$ represents the empirical loss for $q_i$. One can easily verify that in the constraints the empirical loss $\xi_i$ is the maximum among all the losses of permutations for query $q_1$. Equivalently, SVM$^{map}$ minimizes the following regularized hinge loss function $$\sum_{i=1}^{m} \left[ \max_{\pi_i^* \in \Pi_i^*, \pi_i \in \Pi_i \setminus \Pi_i^*} ((E(\pi_i^*, y_i) - E(\pi_i, y_i)) - (F(q_i, d_i, \pi_i^*) - F(q_i, d_i, \pi_i))) \right]_+ + \lambda \|\vec{w}\|^2, \quad (9)$$

where [.] is hinge function.

Intuitively, the first term calculates the total maximum empirical loss when selecting the best permutation for each of the queries. Specifically, if the difference between the permutations $F(q_i, d_i, \pi_i^*) - F(q_i, d_i, \pi_i)$ is less than the difference between the corresponding evaluation measures $E(\pi_i^*, y_i) - E(\pi_i, y_i)$, then there will be a loss, otherwise not. Next, the maximum loss is selected for each query and they are summed up over all the queries.

Since $c \cdot [[x \leq 0]] \leq [c-x]_+$ holds for all $c \in \Re^+$ and $x \in \Re$, it is easy to see that the upper bound in (9) also bounds the basic loss function in (5) (See also FIG. 2B).

In principle, any type two bound can be optimized using optimization techniques such as those in Perceptron, Support Vector Machines, and Boosting. However, the sizes of permutation sets $\Pi^*_i$ and $\Pi_i \dagger \Pi^*_i$ are both of order O(n!), which makes the optimization infeasible. Here n denotes the numbers of documents associated with query $q_i$.

Here we propose a new direct optimization algorithm which efficiently minimizes one of the type two bounds as loss function in a greedy way. The algorithm is referred to as PermuRank and is shown in FIG. 3. The key idea in PermuRank is to maintain a set of perfect permutations and a set of imperfect permutations as working sets, in stead of using the entire set of perfect permutations and the entire set of imperfect permutations.

PermuRank takes a training set $S = \{(q_i, d_i, y_i)\}_{i=1}^{m}$ as input and takes evaluation measure E and number of iterations T as parameters. PermuRank runs T rounds and at each round it creates a ranking model $F_t$ (t=1, ..., T). Finally, it outputs a ranking model F created at the last round.

At each round t, PermuRank maintains a set of perfect permutations and a set of imperfect permutations for each query $q_i$, denoted as $B_i^t$ and $C_i^t$, respectively. These two sets are initialized with an arbitrary perfect permutation $\pi^*_i \in \Pi^*_i$ and an arbitrary imperfect permutation $\pi_i \in \Pi_i \dagger \Pi^*_i$. At each round, the two sets are updated by adding the most violated perfect and imperfect permutations respectively:

$$B_i^{t+1} \leftarrow B_i^t \cup \{\arg\min_{\pi_i \in \Pi_i^*} F_t(q_i, d_i, \pi_i)\}$$

$$C_i^{t+1} \leftarrow C_i^t \cup \{\arg\max_{\pi_i \in \Pi_i \setminus \Pi_i^*} F_t(q_i, d_i, \pi_i)\},$$

At each round t, a ranking model $F_t$ is created using the permutation sets $B_i^t$ and $C_i^t$, i=1, ..., m created so far $$F_t = \arg\max_{F \in \mathcal{F}} L(\mathcal{B}_1^t, C_1^t, \ldots, \mathcal{B}_m^t, C_m^t), \quad (10)$$

where $L(B_1^t, C_1^t, B_m^t, C_m^t)$ is a type two bound, based on $B_i^t$ and $C_i^t$ instead of $\Pi^*_i$ and $\Pi_i \dagger \Pi^*_i$.

In this description, without loss of generality, we use the hinge loss function of Equation (7). The total empirical loss L becomes $$L(B_1, C_1, \ldots, B_m, C_m) = \sum_{i=1}^{m} l(B_i, C_i), \quad (11)$$

where $$l(B_i, C_i) = \frac{1}{|B_i|} \sum_{\pi_i^* \in B_i} \sum_{\pi_i^+ \in C_i} (E(\pi_i^*, y_i) - E(\pi_i, y_i)) \cdot$$

$$[1 - (F(q_i, d_i, \pi_i^*; w) - F(q_i, d_i, \pi_i; w))]_+.$$

In this paper, we employ the SVM technique to minimize the regularized hinge loss function.

The learned ranking model $F_t$ is then used to update $B_i^{t+1}$ and $C_i^{t+1}$ for training the next ranking model $F_{t+1}$.

At each round, PermuRank checks whether the permutation sets $B_i^t$ and $C_i^t$ are changed. If there is no change, the algorithm will stop and return $F_t$ as the final ranking model.

Figure 4:
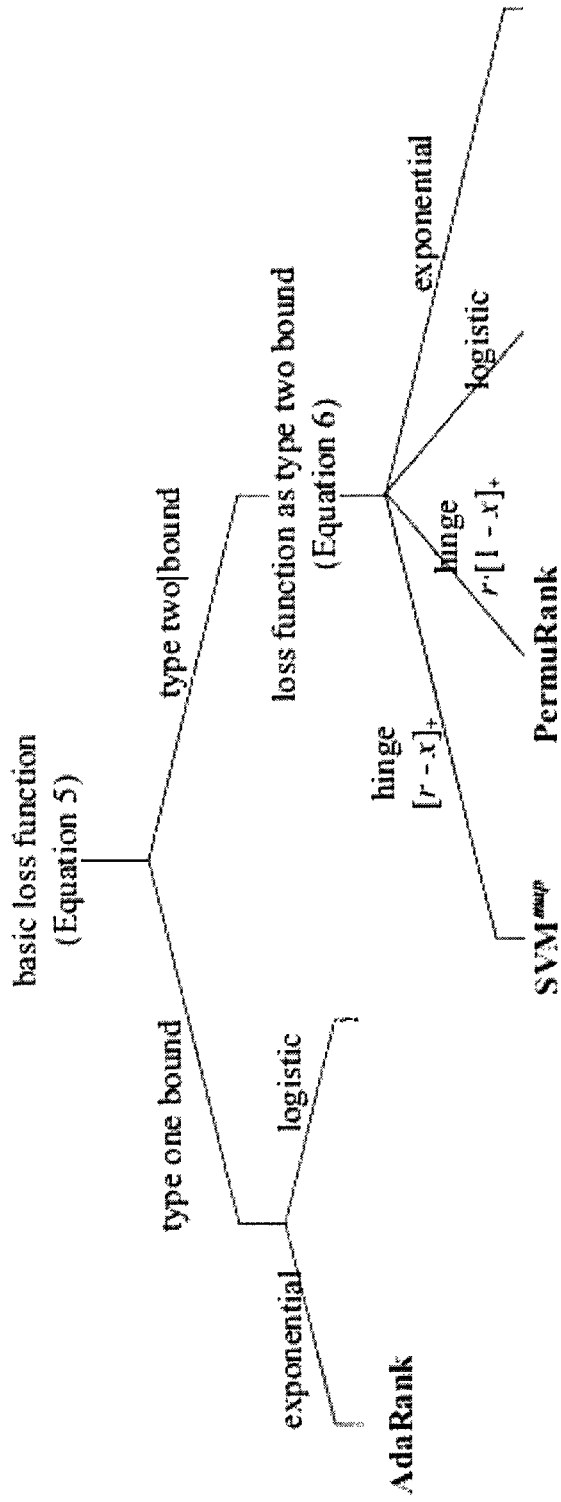
FIG. 4 illustrates the relations in accordance with the summary of the upper bounds on the basic loss function.

We give a summary on the upper bounds on the basic loss function. FIG. 4 shows the relations. There is a basic loss function (5). On the left hand side is type one bound. The upper bounds of exponential loss function, logistic loss function, etc can be used. On the right hand side is type two bound. Equation (6) is the loss function for type two bound, which also upper bounds the basic loss function. Furthermore, the upper bounds of exponential loss function, logistic loss function, hinge loss functions, etc can be considered.

We claim:

1. A method by a computing system including a processor and a memory for improving a ranking model, the method comprising:
   obtaining a training set, wherein the training set includes:
      training queries;
      a document set associated with each training query; and
      document labels, from which at least one perfect and imperfect document set permutations can be inferred for each training query;
   initializing active sets to include a perfect document set permutation and an imperfect document set permutation for each training query;
   optimizing a ranking model in accordance with an empirical loss function, wherein the empirical loss function utilizes the active sets;
   identifying, for each training query, the perfect document set permutation for which the ranking model scores lowest, and the imperfect document set permutation for which the ranking model scores highest;
   updating, by a processor, the active sets to include at least one identified document set permutation that was not initially present; and
   using the updated active sets to additionally optimize the ranking model.

2. The method of claim 1, wherein optimizing the ranking model uses a SVM technique to minimize a regularized hinge loss function.

3. The method of claim 2, wherein optimizing the ranking model involves processing the active sets in accordance with the following, $$L(\mathcal{B}_1, C_1, \ldots, \mathcal{B}_m, C_m) = \sum_{i=1}^{m} l(\mathcal{B}_i, C_i)$$

and $$l(\mathcal{B}_i, C_i) = \frac{1}{|\mathcal{B}_i|} \sum_{\pi_i^* \in \mathcal{B}_i} \sum_{\pi_i \in C_i} (E(\pi_i^*, y_i) - E(\pi_i, y_i)) \cdot$$
$$[1 - (F(q_i, d_i, \pi_i^*; w) - F(q_i, d_i, \pi_i; w))]_+.$$

4. The method of claim 1, wherein the step of updating the active sets involves processing the active sets in accordance with the following $$\mathcal{B}_i^{t+1} \leftarrow \mathcal{B}_i^t \cup \left\{ \arg\min_{\pi_i \in \Pi_i^*} F_t(q_i, d_i, \pi_i) \right\},$$

$$C_i^{t+1} \leftarrow C_i^t \cup \left\{ \arg\max_{\pi_i \in \Pi_i \backslash \Pi_i^*} F_t(q_i, d_i, \pi_i) \right\}.$$

5. The method of claim 1,
   wherein the initializing active sets comprises:
      initializing a perfect active set with an arbitrarily selected perfect permutation for each query; and
      initializing an imperfect active set with an arbitrarily selected imperfect permutation for each query, and
   wherein the updating the active sets comprises:
      updating the perfect active set with any identified perfect document set permutations not present in the perfect active set; and
      updating the imperfect active set with any identified imperfect document set permutations not present in the imperfect active set.

6. The method of claim 1, wherein the empirical loss function is continuous, and upper bounds a basic loss function, which is not continuous.

7. A computing system for improving a ranking model, the system comprising:
   a memory storing an obtained training set, wherein the obtained training set includes:
      training queries;
      a document set associated with each training query; and
      document labels, from which at least one perfect and imperfect document set permutations can be inferred for each training query;
   a component for initializing active sets to include a perfect document set permutation and an imperfect document set permutation for each training query;
   a component for optimizing a ranking model in accordance with an empirical loss function, wherein the empirical loss function utilizes the active sets;
   a component for identifying, for each training query, the perfect document set permutation for which the ranking model scores lowest, and the imperfect document set permutation for which the ranking model scores highest;
   a component for updating the active sets to include at least one identified document set permutation that was not initially present; and
   a component for using the updated active sets to additionally optimize the ranking model.

8. The computing system of claim 7, wherein the component for optimizing the ranking model is configured to use a SVM technique to minimize a regularized hinge loss function.

9. The computing system of claim 8, wherein the component for optimizing the ranking model is configured to process the active sets in accordance with the following, $$L(\mathcal{B}_1, C_1, \ldots, \mathcal{B}_m, C_m) = \sum_{i=1}^{m} l(\mathcal{B}_i, C_i)$$

and $$l(\mathcal{B}_i, C_i) = \frac{1}{|\mathcal{B}_i|} \sum_{\pi_i^* \in \mathcal{B}_i} \sum_{\pi_i \in C_i} (E(\pi_i^*, y_i) - E(\pi_i, y_i)) \cdot$$
$$[1 - (F(q_i, d_i, \pi_i^*; w) - F(q_i, d_i, \pi_i; w))]_+.$$

10. The computing system of claim 7, wherein the component for updating the active sets is configured to process the active sets in accordance with the following $$\mathcal{B}_i^{t+1} \leftarrow \mathcal{B}_i^t \cup \left\{ \arg\min_{\pi_i \in \Pi_i^*} F_t(q_i, d_i, \pi_i) \right\},$$

$$C_i^{t+1} \leftarrow C_i^t \cup \left\{ \arg\max_{\pi_i \in \Pi_i \backslash \Pi_i^*} F_t(q_i, d_i, \pi_i) \right\}.$$

11. The computing system of claim 7, wherein the component for initializing active sets is configured to perform steps comprising:
   initializing a perfect active set with an arbitrarily selected perfect permutation for each query; and
   initializing an imperfect active set with an arbitrarily selected imperfect permutation for each query, and wherein the component for updating the active sets is configured to perform steps comprising:
updating the perfect active set with any identified perfect document set permutations not present in the perfect active set; and
updating the imperfect active set with any identified imperfect document set permutations not present in the imperfect active set.

12. The computing system of claim 7, wherein the empirical loss function is continuous, and upper bounds a basic loss function, which is not continuous.

13. The computing system of claim 7, wherein each time the ranking model is additionally optimized, additional steps are performed, comprising:
repeating the identifying based on the additionally optimized ranking model, and
if an additionally identified document set permutation is missing from the active sets,
repeating the updating and the ranking model optimizing, otherwise
finalizing the ranking model.

14. A computer-readable device storing code, which when executed, runs a method for improving a ranking model, the method comprising:
obtaining a training set, wherein the training set includes:
training queries;
a document set associated with each training query; and
document labels, from which at least one perfect and imperfect document set permutations can be inferred for each training query;
initializing active sets to include a perfect document set permutation, and an imperfect document set permutation for each training query;
optimizing a ranking model in accordance with an empirical loss function, wherein the empirical loss function utilizes the active sets;
identifying, for each training query, the perfect document set permutation for which the ranking model scores lowest, and the imperfect document set permutation for which the ranking model scores highest;
updating the active sets to include at least one identified document set permutation that was not initially present; and
using the updated active sets to additionally optimize the ranking model.

15. The computer-readable device of claim 14, wherein optimizing the ranking model uses a SVM technique to minimize a regularized hinge loss function.

16. The computer-readable device of claim 15, wherein optimizing the ranking model involves processing the active sets in accordance with the following, $$L(\mathcal{B}_1, C_1, \ldots, \mathcal{B}_m, C_m) = \sum_{i=1}^{m} l(\mathcal{B}_i, C_i)$$

and $$l(\mathcal{B}_i, C_i) = \frac{1}{|\mathcal{B}_i|} \sum_{\pi_i^* \in \mathcal{B}_i} \sum_{\pi_i \in C_i} (E(\pi_i^*, y_i) - E(\pi_i, y_i)) \cdot [1 - (F(q_i, d_i, \pi_i^*; w) - F(q_i, d_i, \pi_i; w))]_+.$$

17. The computer-readable device of claim 14, wherein the step of updating the active sets involves processing the active sets in accordance with the following $$\mathcal{B}_i^{t+1} \leftarrow \mathcal{B}_i^t \cup \left\{\arg\min_{\pi_i \in \Pi_i^*} F_t(q_i, d_i, \pi_i)\right\},$$

$$C_i^{t+1} \leftarrow C_i^t \cup \left\{\arg\max_{\pi_i \in \Pi_i \setminus \Pi_i^*} F_t(q_i, d_i, \pi_i)\right\}.$$

18. The computer-readable device of claim 14 wherein the initializing active sets comprises:
initializing a perfect active set with an arbitrarily selected perfect permutation for each query; and
initializing an imperfect active set with an arbitrarily selected imperfect permutation for each query, and
wherein the updating the active sets comprises:
updating the perfect active set with any identified perfect document set permutations not present in the perfect active set; and
updating the imperfect active set with any identified imperfect document set permutations not present in the imperfect active set.

19. The computer-readable device of claim 14, wherein the empirical loss function is continuous, and upper bounds a basic loss function, which is not continuous.

20. The computer-readable device of claim 14, wherein each time the ranking model is additionally optimized, additional steps are performed, comprising:
repeating the identifying based on the additionally optimized ranking model, and
if an additionally identified document set permutation is missing from the active sets,
repeating the updating and the ranking model optimizing, otherwise
finalizing the ranking model.

* * * * *